US009286590B2

(12) United States Patent
Segawa et al.

(10) Patent No.: US 9,286,590 B2
(45) Date of Patent: Mar. 15, 2016

(54) PICKING AND ASSORTING SYSTEM

(75) Inventors: Hirofumi Segawa, Inuyama (JP);
Tsuyoshi Kakinuki, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 156 days.

(21) Appl. No.: 14/118,907

(22) PCT Filed: Apr. 17, 2012

(86) PCT No.: PCT/JP2012/060305
§ 371 (c)(1),
(2), (4) Date: Nov. 20, 2013

(87) PCT Pub. No.: WO2012/165070
PCT Pub. Date: Dec. 6, 2012

(65) Prior Publication Data
US 2014/0107833 A1    Apr. 17, 2014

(30) Foreign Application Priority Data

May 27, 2011    (JP) ................................. 2011-118705

(51) Int. Cl.
*G06F 7/00* (2006.01)
*G06Q 10/08* (2012.01)

(52) U.S. Cl.
CPC ............ *G06Q 10/083* (2013.01); *G06Q 10/087* (2013.01)

(58) Field of Classification Search
USPC ....................................................... 700/214
See application file for complete search history.

(56) References Cited

U.S. PATENT DOCUMENTS

| 7,941,244 | B2* | 5/2011 | Somin et al. | 700/216 |
| 8,494,673 | B2* | 7/2013 | Miranda et al. | 700/216 |
| 2004/0200692 | A1 | 10/2004 | Tanaka | |
| 2006/0195221 | A1 | 8/2006 | Tanaka | |
| 2012/0101627 | A1* | 4/2012 | Lert | 700/216 |

FOREIGN PATENT DOCUMENTS

| JP | 04-016403 A | 1/1992 |
| JP | 2005-335916 A | 12/2005 |
| JP | 2006-347668 A | 12/2006 |
| JP | 2007-039181 A | 2/2007 |

OTHER PUBLICATIONS

Official Communication issued in International Patent Application No. PCT/JP2012/060305, mailed on Jun. 5, 2012.
English translation of Official Communication issued in corresponding International Application PCT/JP2012/060305, mailed on Dec. 12, 2013.

* cited by examiner

*Primary Examiner* — Kyle Logan
(74) *Attorney, Agent, or Firm* — Keating & Bennett, LLP (57) ABSTRACT

In a picking and assorting system, a control unit makes, based on a volume of buckets, a picking schedule for one batch to be picked from article racks into the buckets. If there are articles that have been loaded into the buckets based on the picking schedule for one batch but remain in trays after sorting, then a warehouse control unit causes carriers to move work-in-progress trays from work shelves to a third tray storage space.

14 Claims, 10 Drawing Sheets

PICKING AND ASSORTING SYSTEM

BACKGROUND OF THE INVENTION

1. Field of the Invention

The present invention relates to a picking and assorting system wherein a total picking method is used for picking.

2. Description of the Related Art

In the conventional art, one example of a picking system that sorts orders of articles of a type and quantity prescribed for each shipping destination is a picking system that is based on a total picking method. The total picking method is a method that totals, by type, orders for a plurality of shipping destinations, and picks, by type, the totaled number of articles from a storage area wherein the articles are stored. Furthermore, the articles collectively picked for the same type are sorted by the shipping destinations at an assorting station (e.g., refer to: Japanese Laid-Open Patent Application No. 2007-39181).

With the total picking method, since orders for a plurality of shipping destinations can be picked collectively for each type, picking efficiency is high.

In the total picking method, the storage area is divided into a plurality of picking zones, and a worker is disposed at each of the picking zones. In the picking schedule assigned to the worker, one batch is determined based on the workspace at the assorting station.

Consequently, in the storage area, the picking quantity sometimes varies with the picking zone. For example, there are cases wherein the picking quantity assigned to the worker of a certain picking zone is far smaller than the picking quantity assigned to the workers of other picking zones. Namely, the picking efficiency of that picking zone is lowered and, in turn, the picking efficiency of the entire storage area is also lowered.

On the other hand, if the picking efficiency at the storage area is to be improved, it is conceivable that the assorting station lacks enough space for sorting by shipping destination. Specifically, a problem arises wherein containers, which house the picked articles, pile up or overflow at the assorting station, which runs out of space to place the containers. In other words, there is a possibility that the efficiency of the entire process, from picking to sorting, will not improve.

SUMMARY OF THE INVENTION

Preferred embodiments of the present invention improve, in a total picking method, picking efficiency in each picking zone, and furthermore improve the efficiency of the entire process, from picking to sorting.

In the description below, a plurality of elements, features and characteristics of various preferred embodiments of the present invention will be explained. These elements, features and characteristics can be combined arbitrarily as desired.

A picking and assorting system according to a preferred embodiment of the present invention is preferably used with a plurality of picking zones. Each of the picking zones includes an article rack including plural kinds of articles. The article racks are utilized for total picking by using first containers. The picking and assorting system includes a picking schedule making unit, an automatic storage system, and a controller. The picking schedule making unit is configured and programmed to make a picking schedule for one batch of the articles to perform total pickings to pick the articles from the article racks and place the articles in the first containers, based on a workload in each of the picking zones. The automatic storage system is used to facilitate assorting articles from the first containers to second containers after the total picking. The automatic storage system includes an assorting station, a storage shelf, and a moving device. The assorting station includes a placement portion and a work shelf. The first containers are placed on the placement portion. The second containers are placed on the work shelf such that the articles can be assorted from the first containers to the second containers. On the storage shelf, the second containers are stored. The moving device is configured to move the second containers between the work shelf and the storage shelf. The controller is configured and programmed to, if an article picked and placed into the first containers according to the picking schedule for the one batch remains in the second container after assorting, order the moving device to move the second container in a work-in-progress state from the work shelf to the storage shelf.

In this system, the picking schedule for one batch to be picked from the article racks into the first containers is made based on the workload in the picking zones. Accordingly, the picking schedule is made such that the workload in the picking zones are averaged. Accordingly, zones wherein the amount of the picking work is extremely small hardly arise; as a result, the picking efficiency improves. Furthermore, it is acceptable that the workload in the picking zone is determined, for example, based on the order count that is at or close to the maximum that can be contained in the first containers, the result of calculating the volume of the articles that can be contained in the first containers, or the result of calculating the distances that the workers walk.

On the other hand, in the sorting work performed at the automatic storage system, the situation arises wherein articles have been loaded into the first containers based on the picking schedule for the one batch but remain in sorting containers after the sorting. Such second containers wherein the articles remain, namely, the second containers in the work-in-progress state, are moved by the moving device from the work shelf to the storage shelf. As a result, the second containers do not pile up in the sorting space. Accordingly, the efficiency of the sorting work does not decline.

It is acceptable that the picking schedule making unit is configured and programmed to determine the number of second containers in the work in progress state stored in the storage shelf. In this case, the picking schedule making unit preferentially selects articles to be assorted into the second containers in the work-in-progress state stored in the storage shelf when making a picking schedule for the one batch if the number of the second containers in the work in progress state stored in the storage shelf exceeds a certain number.

In this system, if the number of the empty storage shelves decreases, then the details of the picking schedule are adjusted to prevent the storage shelves from being filled up.

A picking and assorting system according to another preferred embodiment of the present invention includes a plurality of picking zones, a picking schedule making unit, an automatic storage system, and a controller. Each of the picking zones includes an article rack including plural kinds of articles. Total picking is performed from the article racks by using first containers. The picking schedule making unit is configured to make a picking schedule for one batch of the articles to perform total picking to pick the articles from the article racks and place the articles in the first containers, based on a workload in each of the picking zones. The automatic storage system is used to facilitate assorting articles from the first containers to second containers after the total picking. The automatic storage system includes an assorting station, a storage shelf, and a moving device. The assorting station includes a placement portion onto which the first containers are placed, and a work shelf onto which the second containers are placed such that the articles can be assorted from the first containers to the second containers. The first containers are stored on the storage shelf. The moving device is configured to move the first containers between the placement portion and the storage shelf. The controller is configured and programmed to, if some of the articles picked and placed into the first container according to the picking schedule for the one batch cannot be assorted to the second containers, order the moving device to move the first container containing the articles from the placement portion to the storage shelf.

In this system, the picking schedule for one batch to be picked from the article rack and placed into the first containers is made based on the workload in the picking zones. Accordingly, the picking schedule is made such that the workloads in the picking zones are averaged. Accordingly, zones wherein the amount of the picking work is extremely small hardly arise; as a result, the picking efficiency improves. Furthermore, it is acceptable that the workload in each of the picking zones is determined, for example, based on the order count that is at or close to the maximum that can be contained in the first containers, the result of calculating the volume of the articles that can be contained in the first containers, or the result of calculating the distances that the workers walk.

On the other hand, in the sorting work performed at the automatic storage system, the situation arises wherein articles have been loaded into the first containers based on the picking schedule for the one batch but the sorting of those articles into the second containers could not be completed. Such first containers wherein the articles remain are moved by the moving device from the placement portion to the storage shelf. As a result, the first containers other than the first containers wherein the articles remain are quickly carried to the placement portion, which makes it possible to quickly complete the sorting into the second containers that are capable of being completed. Accordingly, the efficiency of the sorting work does not decline.

It is acceptable that the picking schedule making unit is configured and programmed to determine the number of first containers containing articles and stored in the storage shelf. In this case, the picking schedule making unit preferentially selects articles to be assorted together with articles in the first containers containing the article and stored in the storage shelf when making a picking schedule for one batch if the number of the first containers containing the article and stored in the storage shelf exceeds a certain number.

In this system, if the number of the empty storage shelves decreases, then the details of the picking schedule are adjusted to prevent the storage shelves from being filled up.

It is acceptable that the automatic storage system includes assorting stations in a plurality of positions. In this case, the controller is programmed to determine which first container and which second container are to be delivered to each of the assorting stations such that assortment workload is averaged.

In this system, the efficiency of the sorting work is increased.

Picking and assorting systems according to various preferred embodiments of the present invention improves, in a total picking method, the picking efficiency in each picking zone, and furthermore improves the efficiency of the entire work, from picking to sorting.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7 is a chart that shows one example of the picking schedule.

DETAILED DESCRIPTION OF THE PREFERRED EMBODIMENTS

Figure 1:
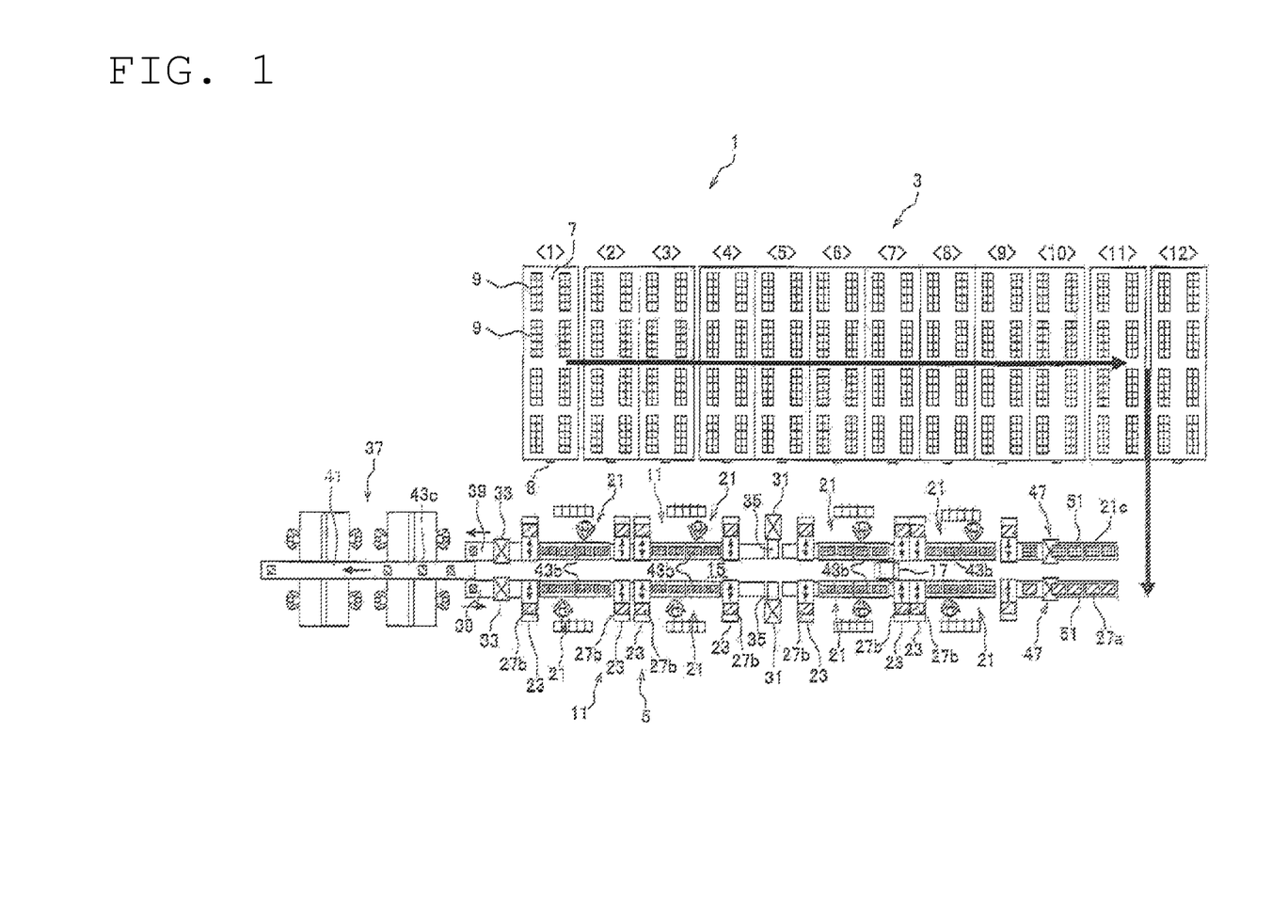
FIG. 1 is a plan view of a picking and assorting system.
Figure 2:
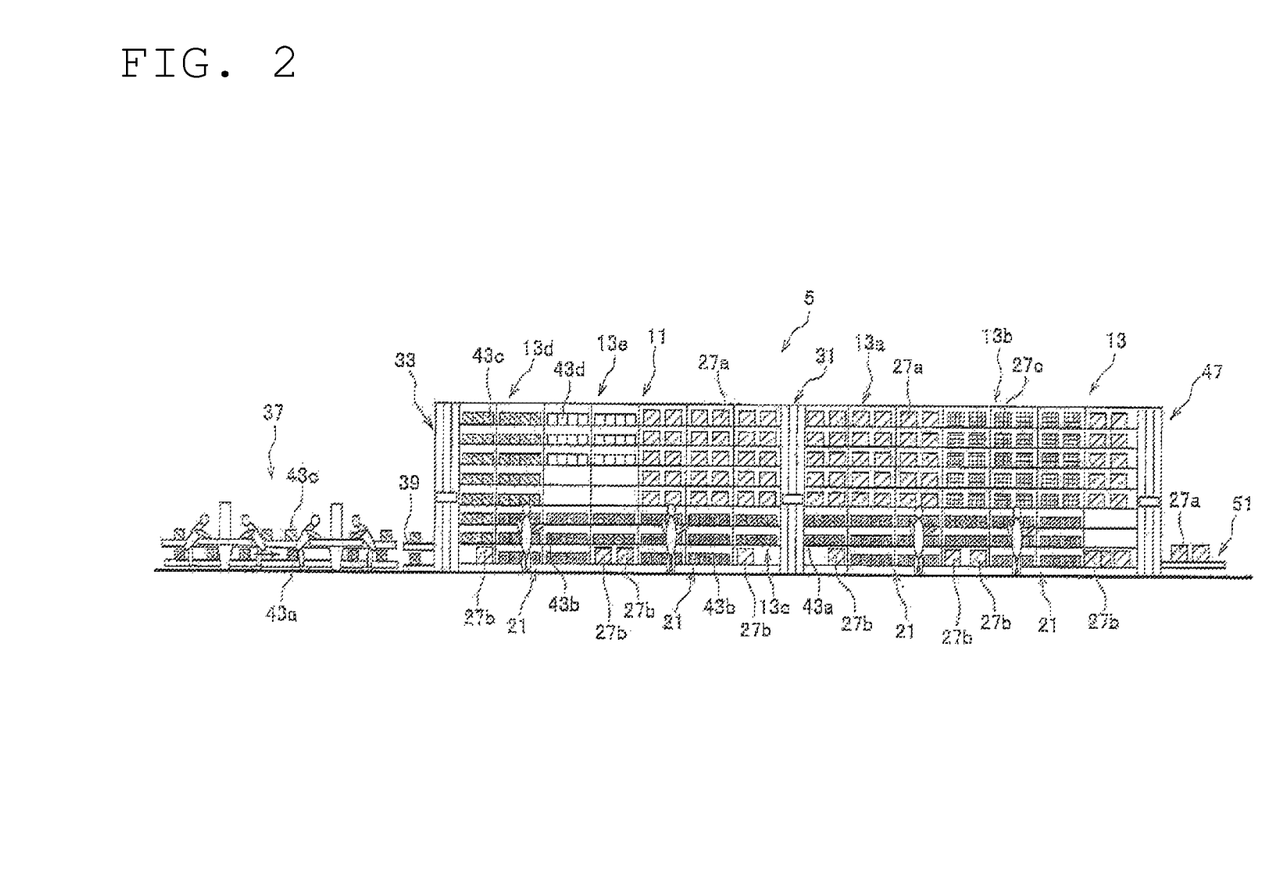
FIG. 2 is a side view of an assorting system.

A picking and assorting system 1, wherein a total picking method is adopted as a picking system that sorts, by shipping destination, orders of articles of a type and quantity prescribed by the shipping destination, will be explained referring to FIG. 1 and FIG. 2. FIG. 1 is a plan view of the picking and assorting system, and FIG. 2 is a side view of the assorting system.

As shown in FIG. 1, the picking and assorting system 1 includes a picking system 3 and an automatic storage system 5.

The picking system 3 is a workstation where workers pick a plurality of the articles into buckets 27a through 27c. The picking system 3 is divided into a plurality of zones <1>-<12>, and a worker is assigned to each of the zones. Each of the zones is provided with numerous article racks 9, which are disposed along a passageway 7. In addition, each of the zones is provided with a terminal device 8, which includes a display and the like.

In the picking system 3, the orders for the plurality of shipping destinations are totaled by type, and the totaled number of articles by type are picked from the article racks 9 whereon the articles are stored. Specifically, based on information obtained at the terminal device 8, each worker picks, while pushing a cart, the designated articles into the buckets 27a through 27c. As a result, multiple types of articles are intermixed in the buckets 27a through 27c. Next, the worker carries the buckets 27a through 27c to the automatic storage system 5. Furthermore, a picking area may be configured to use a flow rack.

The automatic storage system 5 is an apparatus that supports the work of sorting, into trays 43, the articles picked by the picking system 3. The automatic storage system 5 includes two rows of racks 11. Each of the racks 11 includes a plurality of shelves 13. A travelling space 15 is secured between the two rows of racks 11. The automatic storage system 5 includes a plurality of carriers 17, which is disposed in the travelling space 15. The carriers 17 are disposed at heights that correspond to the levels of the racks 11.

The racks 11 house a plurality of the buckets 27 and a plurality of the trays 43a through 43d. The buckets 27 are picking-completed buckets 27a when they are carried into the automatic storage system 5, become sorting-in-progress buckets 27b when they are carried to assorting stations 21 (described later), and become empty buckets 27c when the sorting work ends. The trays 43a through 43d are empty trays 43a when they are carried into the automatic storage system 5, become sorting-in-progress trays 43b when they are carried to the assorting stations 21, become sorting-done trays 43c when the sorting is complete, and become work-in-progress trays 43d if the sorting ends in the work-in-progress state.

The automatic storage system 5 includes the assorting stations 21, which serve as spaces where the sorting work is performed, that are disposed on the surfaces of the racks 11 that are opposite to the side of the travelling space 15. The assorting stations 21 are disposed in the two to four levels of the lower portions of the racks 11. The automatic storage system 5 includes first conveyors 23, which protrude toward the assorting stations 21. A bucket platform 25 (FIG. 3), whereon the sorting-in-progress buckets 27b are mounted, is provided at the leading edge of each of the first conveyors 23.

Figure 3:
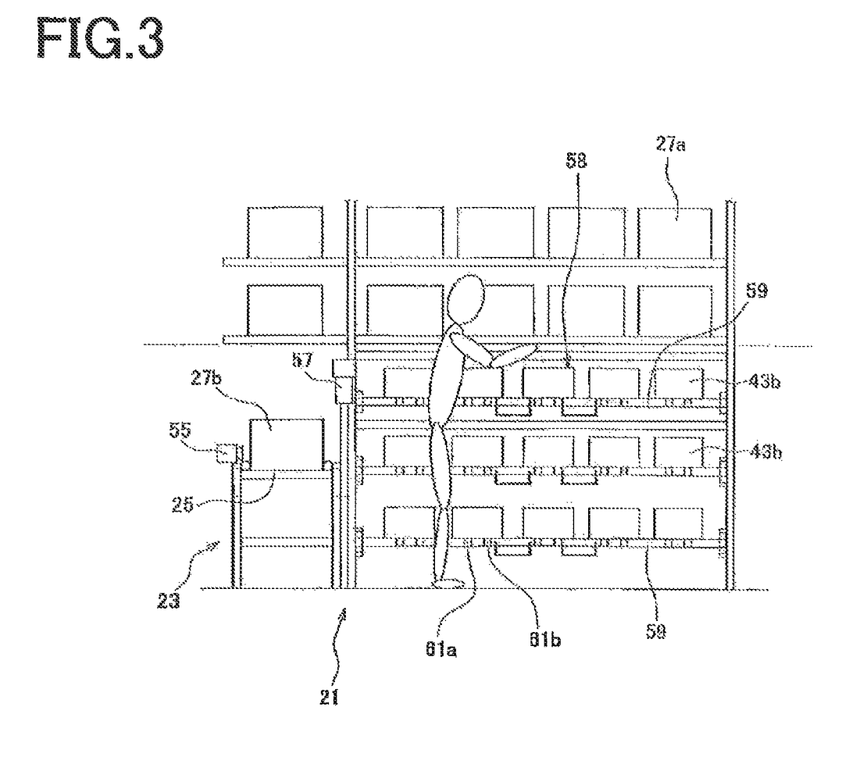
FIG. 3 is a schematic front view of an assorting station.

Each of the assorting stations 21 is provided with a first ID reader 55, which reads an ID of the picking-completed bucket 27a mounted on the bucket platform 25. In addition, a second ID reader 57, which reads the ID of the picked article, is also provided.

Each of the assorting stations 21 is provided with work shelves 58, whereon the sorting-in-progress trays 43b are placed. Each of the work shelves 58 includes a plurality of drawers 59, whereon the sorting-in-progress trays 43b are mounted. Each of the drawers 59 is provided with a feed-in location indicator lamp 61a and a sorting completed indicator lamp 61b at each of the locations where the sorting in progress trays 43b are loaded. The feed-in location indicator lamps 61a are lamp switches.

During the sorting work, each worker initially picks arbitrarily an article from the sorting-in-progress bucket 27b and reads the ID of the article using the second ID reader 57. At this time, even if there are a plurality of articles of the same type, the worker picks the articles and reads their IDs, one at a time. Upon performance of the abovementioned ID reading, a sorting control unit 149 (FIG. 8), based on the detection result, turns on the feed-in location indicator lamp 61a at the location where the sorting-in-progress tray 43b into which that article is to be fed is mounted. At this time, if articles of the same type are divided up into and contained in a plurality of the sorting-in-progress buckets 27b, then a plurality of locations are applicable, and therefore the feed-in location indicator lamps 61a at a plurality of locations are turned on. Furthermore, even if one of the sorting-in-progress trays 43b corresponds to an order for articles of the same type, the feed-in location indicator lamp 61a is not turned on if feeding for that sorting-in-progress tray 43b has already ended.

During the sorting work, the worker next feeds one of the sorting-in-progress trays 43b corresponding to one of the feed-in location indicator lamps 61a that was turned on.

During the sorting work, lastly, the worker presses the feed-in location indicator lamp 61a. Based on that result, the sorting control unit 149 determines whether or not sorting for that sorting-in-progress tray 43b is complete, and, if sorting is complete, turns the sorting completed indicator lamp 61b on.

The automatic storage system 5 further includes first lifters 31 and second lifters 33 for connecting with the shelves 13 located at the upper and lower levels. The automatic storage system 5 further includes second conveyors 35, which connect the first lifters 31 and the carriers 17, and third conveyors 39, which connect the second lifters 33 to a packing station 37. The packing station 37 includes a fourth conveyor 41. The fourth conveyor 41 carries the sorting-done trays 43c to each station and, furthermore, carries the empty trays 43a to the third conveyors 39. The worker picks up the articles from the sorting-done tray 43c on the fourth conveyor 41 and packs the articles.

The automatic storage system 5 further includes third lifters 47 on the inlet side. The third lifters 47 scoop up the picking-completed buckets 27a from carrying surfaces of fifth conveyors 51. Furthermore, above the fifth conveyors 51, the picking-completed buckets 27a are loaded onto the carriers 17. Furthermore, the third lifters 47 unload the empty buckets 27c onto the fifth conveyors 51.

The shelves 13 are divided into the following five storage spaces. The allocation of these spaces may be fixed or may vary according to circumstances. In addition, these storage spaces preferably are used principally as buffers in accordance with requirements:

a first bucket storage space 13a, which stores the picking-completed buckets 27a;

a second bucket storage space 13b, which stores the empty buckets 27c;

a first tray storage space 13c, which stores the empty trays 43a;

a second tray storage space 13d, which stores the sorting-done trays 43c; and a third tray storage space 13e, which stores the work-in-progress trays 43d.

The picking-completed buckets 27a are carried into the first bucket storage space 13a by the fifth conveyors 51, the third lifters 47, and the carriers 17.

The empty trays 43a are carried into the first tray storage space 13c by the fourth conveyor 41, the second lifters 33, and the carriers 17.

During sorting, the picking-completed buckets 27a are carried from the first bucket storage space 13a to the bucket platforms 25 by the carriers 17 and the first conveyors 23. Because there is a plurality of the picking-completed buckets 27a corresponding to the picking instruction for one batch, a plurality of the picking-completed buckets 27a are sequentially carried to the bucket platforms 25.

After sorting ends, the empty trays 43a are carried to the shelves of the assorting stations 21 by the carriers 17. The sorting-done trays 43c are carried to the second tray storage space 13d by the carriers 17. The work-in-progress trays 43d are carried to the third tray storage space 13e by the carriers 17.

Furthermore, the automatic storage system 5 includes a warehouse control unit 141 (described later), which controls the configuration described above.

Initially, the entire configuration of a distribution center 101 will be explained.

In the distribution center 101, ordered articles are carried out in accordance with order received information transmitted from each retail shop; at that time, the ordered articles are picked, by shipping destination, into delivery containers and the like and then delivered to the shipping destinations. Furthermore, the order received information includes, for example, a retail shop number, a retail shop name, an ordered article name, an article number or an article code, an orders received count, the shipping destination, a delivery route, and the delivery container (e.g., the container and the like).

Figure 4:
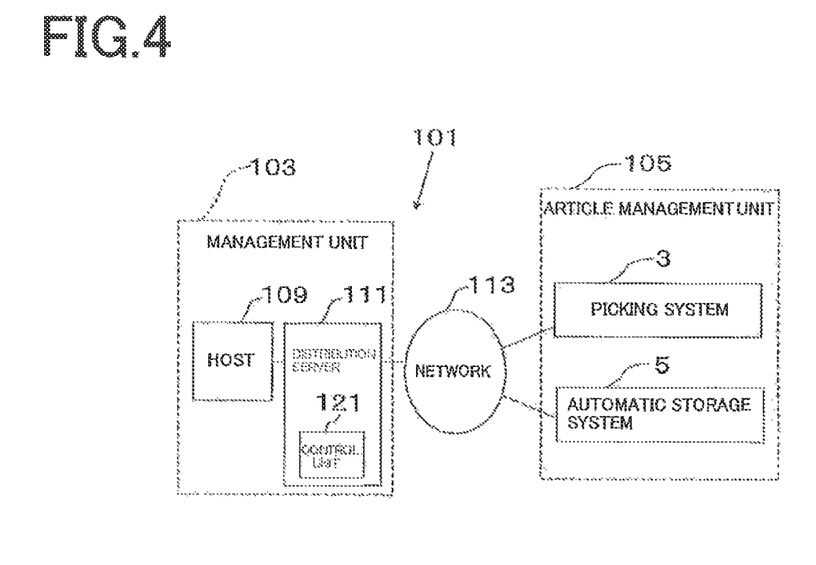
FIG. 4 is a block diagram that illustrates the configuration of an article management unit.
Figure 5:
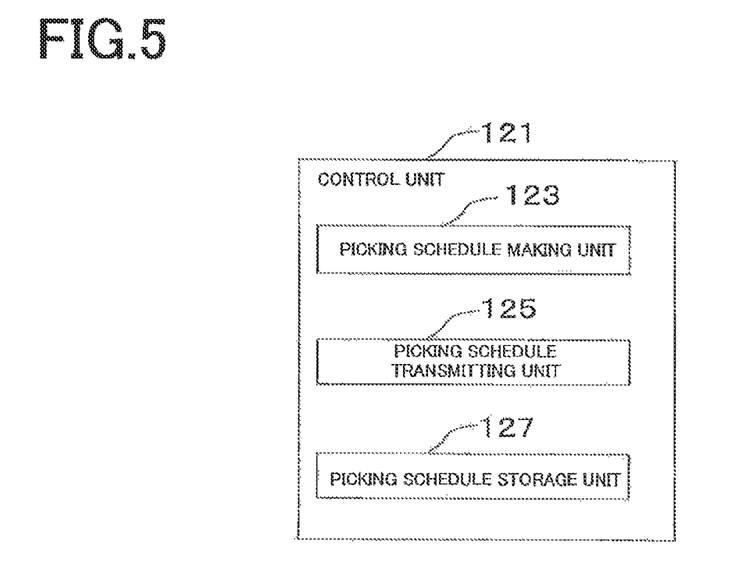
FIG. 5 is a block diagram that shows the functions of a distribution server.

Next, the distribution center 101 will be explained specifically, referring to FIG. 4 and FIG. 5. FIG. 4 is a block diagram that shows the configuration of an article management unit, and FIG. 5 is a block diagram that shows the functions of a distribution server.

As shown in FIG. 4, the distribution center 101 is divided into a management unit 103 and an article management unit 105. The management unit 103 includes a host 109 and a distribution server 111. The article management unit 105 includes the above-described picking system 3 and the above-described automatic storage system 5. The distribution server 111 is connected to the picking system 3 and the automatic storage system 5 via a network 113.

The host 109 of the management unit 103 preferably is a computer that sends and receives orders of the articles, manages the inventory of the articles, and the like; furthermore, the host 109 of the management unit 103 receives order received information from each of the retail shops and generates shipping instruction information based on the order received information. The shipping instruction information is generated based on the order received information and includes, for example, a batch number, the article number, a category, the shipping destination, the number of articles in a delivery container, a delivery container count, a delivery course, a location, a stacking order, and a carry-out destination by a conveyor. The shipping instruction information is transmitted to the distribution server 111 via the network.

The distribution server 111 of the management unit 103 receives the shipping instruction information, generates a picking schedule, and transmits the picking schedule to the terminal devices 8 (FIG. 1) of the picking system 3. As a result, based on the information obtained from the terminal devices 8, the workers can perform the picking work in the prescribed work procedure. Furthermore, the picking schedule includes instruction information in the picking system 3 that relates to, for example, workers' work details and picking details wherein the ordered articles are picked in accordance with the prescribed picking method, and the like.

A control unit 121 of the distribution server 111 preferably is a computer that includes: a CPU, which performs various arithmetic processes, control, and the like; ROM, wherein a program is stored; and RAM, wherein various information is stored temporarily. The control unit 121 includes, as shown in FIG. 5, a picking schedule making unit 123, a picking schedule transmitting unit 125, and a picking schedule storage unit 127. These functions are described below.

In the distribution center 101, which is configured as described above, the host 109 of the management unit 103 receives order received information from each retail store (not shown), and generates the shipping instruction information based on the order received information.

The shipping instruction information is sequentially transmitted from the host 109 to the distribution server 111, which generates the picking schedule based on the shipping instruction information. The picking schedule is transmitted from the distribution server 111 to the terminal devices 8 of the picking system 3. Based on the picking schedule, the workers start the shipping work for the ordered articles.

Figure 6:
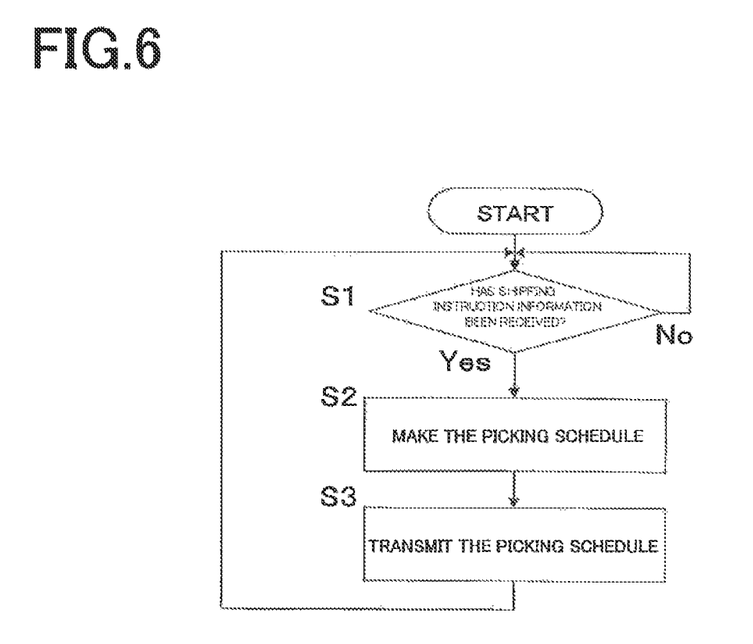
FIG. 6 is a flow chart that explains a generation and transmission operation of a picking schedule.

One example of the procedure for generating the picking schedule in the distribution server 111 will be explained, referring to FIG. 6. FIG. 6 is a flow chart that explains the picking schedule generation and transmission operation.

In step S1, the distribution server 111 waits for the transmission of the shipping instruction information from the host 109.

In step S2, the picking schedule making unit 123 of the control unit 121 generates the picking schedule for one batch or a plurality of batches. At this time, one batch in the picking schedule is generated based on the volume of each of the buckets 27. Namely, the batch is determined such that, in each of the picking zones, orders subsequent to an order that exceeds the volume of every one of the buckets 27 are carried forward to the next batch.

In step S3, the picking schedule transmitting unit 125 of the control unit 121 transmits the picking schedule for one batch or a plurality of batches to the picking system 3 via the network 113.

The picking schedule for a plurality of batches in each picking zone will be explained referring to FIG. 7. FIG. 7 is a chart that shows one example of the picking schedule.

FIG. 7 shows article orders allocated to each zone in a picking schedule for a first batch, a second batch, and a third batch. For example, for orderer "a", one order is issued in each of the zone <1> and the zone <4>.

In the picking schedule, one batch is set such that a picking order count in each zone reaches the maximum permissible quantity of the buckets 27 (in the present preferred embodiment, 8 orders, for example). Accordingly, for example, in the zone <5>, up to the order "v" is the first bucket, and up to the order "H" is the second bucket. Furthermore, the picking orders count in each zone can be set as appropriate and may also be modified according to conditions. In addition, here, "order" means a type of articles.

As a result of the above, in each zone, the maximum number of orders is allocated to each batch. Accordingly, the picking efficiency of the picking system 3 is improved. Furthermore, in the conventional art, batches are delimited by the number of orderers. Therefore, for example, in the case of the orderers "a"-"I", the order count in the zone <1>, the zone <5>, and the zone <9> is 5, whereas the order count in the zone <10> and the zone <11> is 0. Namely, in this case, picking is not performed in the zone <10> and the zone <11>.

Figure 8:
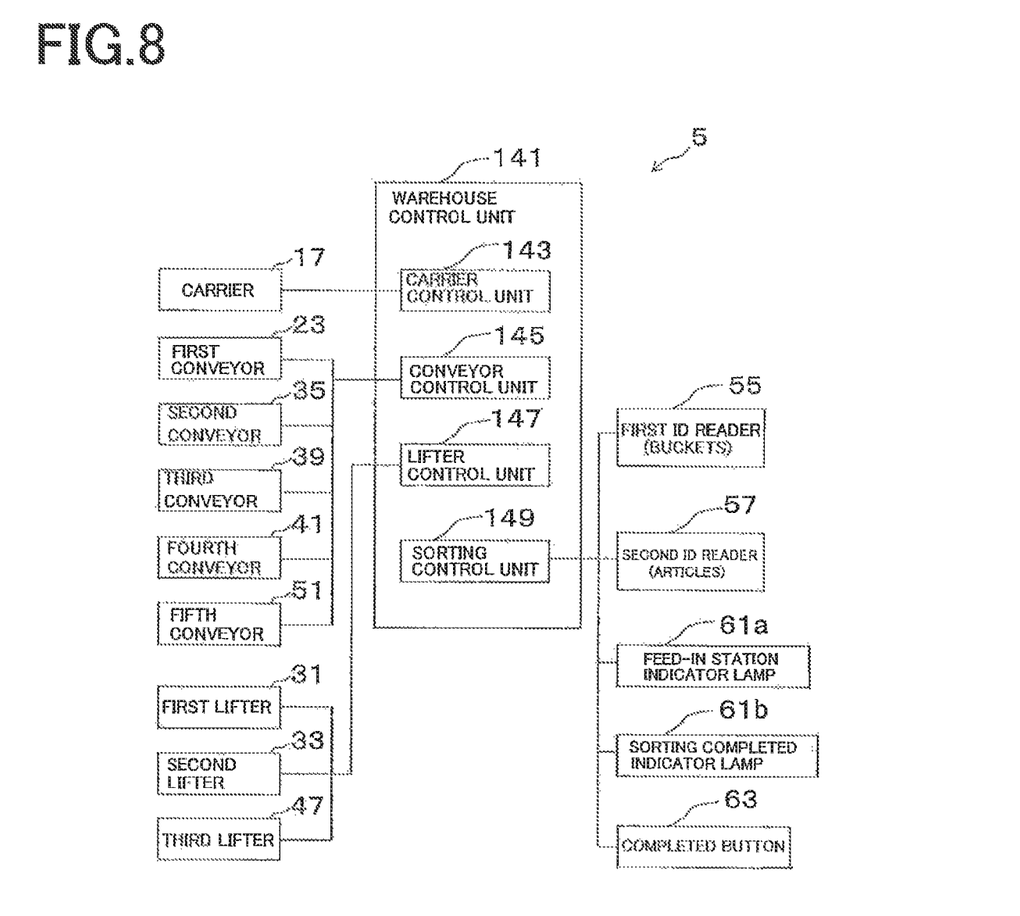
FIG. 8 is a block diagram that shows the functions of a warehouse control unit.

FIG. 8 shows the configuration of the warehouse control unit 141. FIG. 8 is a block diagram that shows the functions of the warehouse control unit.

The warehouse control unit 141 preferably is a computer that includes: a CPU, which performs various arithmetic processes, control, and the like; ROM, wherein a program is stored; and RAM, wherein various information is stored temporarily. The warehouse control unit 141 includes a carrier control unit 143, a conveyor control unit 145, a lifter control unit 147, and the sorting control unit 149. The carrier control unit 143 can transmit carrying instructions to the carriers 17. The conveyor control unit 145 can transmit drive instructions to the first conveyors 23, the second conveyors 35, the third conveyors 39, the fourth conveyor 41, and the fifth conveyors 51. The lifter control unit 147 can transmit drive instructions to the first lifters 31, the second lifters 33, and the third lifters 47.

The sorting control unit 149 can receive the IDs of the sorting-in-progress buckets 27b from the first ID readers 55 and can receive the IDs of the picked articles from the second ID readers 57. The sorting control unit 149 can receive completion signals from COMPLETED buttons 63. Furthermore, the sorting control unit 149 can turn the feed-in location indicator lamps 61a and the sorting completed indicator lamps 61b on and off.

Figure 9:
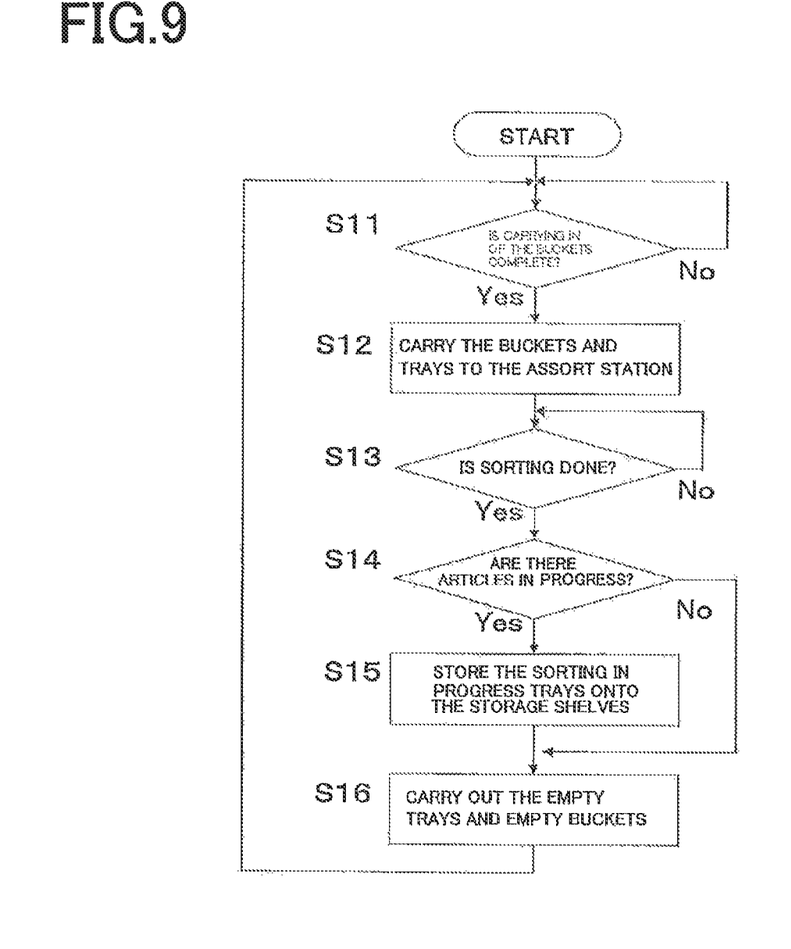
FIG. 9 is a flow chart that shows control and operation during sorting work in an automatic storage system.

Various operations during the sorting work in the automatic storage system 5 will be explained referring to FIG. 9. FIG. 9 is a flow chart that shows the control and operation that is performed during the sorting work in the automatic storage system.

In step S11, the warehouse control unit 141 waits for the buckets 27 for one batch to be carried into the automatic storage system 5. The confirmation thereof is based on, for example, detection results of sensors (not shown) disposed in the fifth conveyors 51.

In step S12, the warehouse control unit 141 (specifically, the carrier control unit 143, the conveyor control unit 145, and the lifter control unit 147) causes the drive apparatuses to deliver the picking-completed buckets 27a and the empty trays 43a to the assorting stations 21. At this time, if there are work-in-progress trays 43d, which have transitioned to the work-in-progress state owing to the previous sorting work, in the third tray storage space 13e, then the work-in-progress trays 43d are also delivered to the assorting stations 21 as appropriate. Thus, the workers perform the sorting in the state wherein the picking-completed buckets 27a and the empty trays 43a (as well as the work-in-progress trays 43d) have been carried to the assorting stations 21.

During the sorting work, the workers pick articles from the picking-completed buckets 27a and cause the second ID readers 57 to read the IDs of the articles. Based on the results thereof, the sorting control unit 149 turns on the feed-in location indicator lamps 61a corresponding to the empty trays 43a to be sorted and also displays the quantities. Furthermore, the workers sort the required number of articles into the prescribed empty trays 43a. Every time when the sorting ends, the workers press the COMPLETED buttons 63 (FIG. 8). Based on the result thereof, the sorting control unit 149 turns off the feed-in location indicator lamps 61a.

In step S13, the warehouse control unit 141 waits for the sorting to end. The end of sorting means the state wherein all the buckets 27 for one batch in the picking schedule have become empty. When the sorting ends, the sorting completed indicator lamps 61b are turned on.

In step S14, the warehouse control unit 141 determines whether or not there are any work-in-progress trays 43d. If "Yes", then the process transitions to step S15; if "No", then the process skips step S15 and transitions to step S16.

In step S15, the warehouse control unit 141 (specifically, the carrier control unit 143, the conveyor control unit 145, and the lifter control unit 147) causes the drive apparatuses to deliver the work-in-progress trays 43d to the third tray storage space 13e.

In the preferred embodiment shown in FIG. 7, in the sorting corresponding to the first picking schedule, the trays 43 corresponding to the following 4 orderers become work-in-progress trays 43d, which are delivered to the third tray storage space 13e. These are the orderer "s," the orderer "u," the orderer "w," and the orderer "z."

In step S16, the warehouse control unit 141 (specifically, the carrier control unit 143, the conveyor control unit 145, and the lifter control unit 147) causes the drive apparatuses to carry the empty buckets 27c and the empty trays 43a out of the assorting stations 21. The empty buckets 27c are stored in the second bucket storage space 13b. The empty trays 43a are stored in the first tray storage space 13c.

The picking and assorting system 1 (which is one example of a picking and assorting system) is preferably used with a plurality of picking zones. Each of the picking zones includes the article racks 9 (which are one example of an article rack) that are utilized for total picking by using the buckets 27 (which are one example of first containers). The picking and assorting system 1 includes the control unit 121 (which is one example of a picking schedule making unit), the automatic storage system 5 (which is one example of an automatic storage system), and the warehouse control unit 141 (which is one example of a controller). The control unit 121 makes, based on the workload at each picking zone, the picking schedule for one batch about picking articles from the article racks 9 to the buckets 27.

The automatic storage system 5 is used to facilitate assorting article from the buckets 27 to the trays 43 (which are one example of second containers) after the total picking. The automatic storage system 5 includes the assorting stations 21 (which are one example of an assorting station), the storage spaces (13c-13e) (which are one example of a storage shelf), and the carriers 17 (i.e., moving devices). The assorting station 21 includes the bucket platforms 25 and the work shelves 58. The picking-completed buckets 27a are placed onto the bucket platforms 25. The empty trays 43a are placed onto the work shelves 58 such that the articles can be assorted from the picking-completed buckets 27a to the empty trays 43a. The trays 43 are stored in the storage spaces (13c-13e). The carriers 17 can move the trays 43 between the work shelves 58 and the storage spaces (13c-13e).

If articles have been loaded into the buckets 27 according to the picking schedule for one batch but articles remain in the trays 43 after the assortment, then the warehouse control unit 141 orders the carriers 17 to move the work-in-progress trays 43d from the work shelves 58 to the third tray storage space 13e.

In this system, the picking schedule for one batch to be picked from the article racks 9 into the buckets 27 is made based on the volume of the buckets 27. Accordingly, the picking schedule is made such that a quantity of articles equal to or close to the maximum are picked and placed into the buckets 27. Accordingly, zones wherein the amount of the picking work is extremely small hardly arise; as a result, the picking efficiency improves.

On the other hand, in the sorting work performed at the automatic storage system 5, a state arises wherein articles have been loaded into the buckets 27 based on the picking schedule for one batch but articles remain in the trays 43 after the assortment. The work-in-progress trays 43d, wherein such articles remain, are moved by the carriers 17 from the work shelves 58 to the third tray storage space 13e. As a result, the trays 43 do not pile up in the assorting stations 21. Accordingly, the efficiency of the sorting work also does not decline.

The above text describes one preferred embodiment of the present invention, but the present invention is not limited to that preferred embodiment, and various modifications may be effected without departing from the spirit and scope of the present invention. In particular, a plurality of the preferred embodiments and modified examples described in the present specification can be arbitrarily combined as needed.

Figure 10:
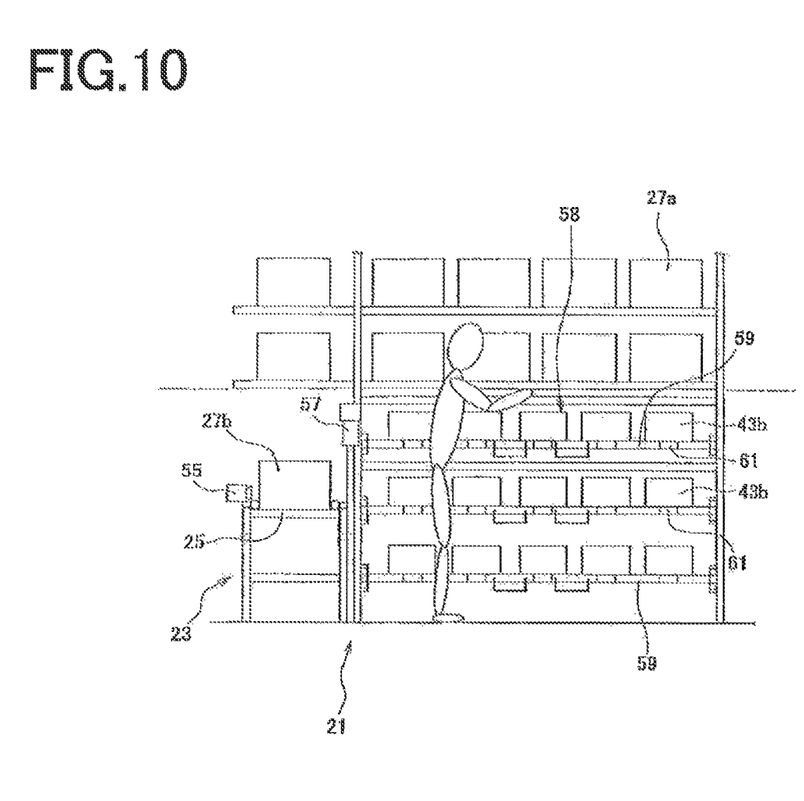
FIG. 10 is a schematic front view of an assorting station.
Figure 11:
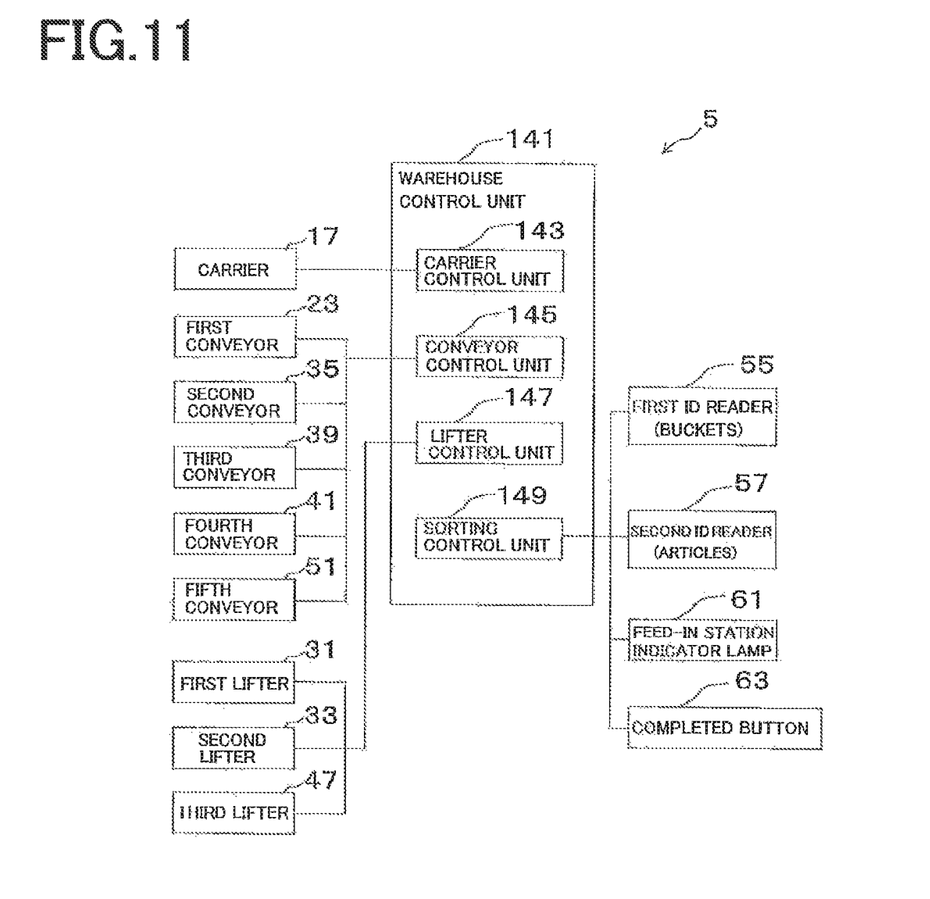
FIG. 11 is a block diagram that shows the functions of the warehouse control unit.

In another preferred embodiment of the present invention, as shown in FIG. 10 and FIG. 11, displays 61 are provided to the work shelves 58. Each of the displays 61 turns on if it corresponds to one of the sorting-in-progress trays 43b that contains the same articles as the article read by the second ID reader 57. In addition, the sorting quantity is also displayed on the display 61.

In another preferred embodiment of the present invention, if there are articles that were loaded into the buckets 27 based on the picking schedule for one batch but the sorting of the articles into the trays 43 could not be completed, then the warehouse control unit 141 orders the carriers 17 to move the buckets 27 in which the articles remain from the bucket platforms 25 to the storage shelves. This operation is performed, for example, after the sorting ends. As a result, the buckets 27 other than the buckets 27 in which the articles remain are quickly delivered to the bucket platforms 25, which makes it possible to quickly complete the sorting into the trays 43 that are capable of being completed. Accordingly, the efficiency of the sorting work does not decline.

In addition, the picking schedule making unit 123 of the control unit 121 can determine the number of the buckets 27 in which the articles remain stored on the storage shelves. Specifically, the warehouse control unit 141 transmits, to the control unit 121 of the distribution server 111, the number of the buckets in which the articles remain stored on the storage shelves. If the number of the buckets 27 in which the articles remain stored on the storage shelves exceeds a prescribed number, then the picking schedule making unit 123 preferentially selects, in the picking schedule generation for one batch, the articles to be sorted together with the articles remaining in the buckets 27 in which the articles remain housed on the storage shelves. In this system, if the number of the empty storage shelves decreases, then the details of the picking schedule are adjusted to prevent the storage shelves from being filled up.

In another preferred embodiment, the picking schedule making unit 123 of the control unit 121 can determine the number of the work-in-progress trays 43d stored in the third tray storage space 13e. Specifically, the warehouse control unit 141 transmits, to the control unit 121 of the distribution server 111, the number of the work-in-progress trays 43d stored in the third tray storage space 13e. If the number of the work-in-progress trays 43d stored in the third tray storage space 13e exceeds a prescribed number, then the picking schedule making unit 123 preferentially selects, in the picking schedule generation for one batch, the articles to be sorted into the work-in-progress trays 43d during the next picking schedule generation (i.e., in step S2 in FIG. 6).

In the preferred embodiment shown in FIG. 7, the following six orders are preferentially selected in the second picking schedule. These are one remaining for the orderer "s," one remaining for the orderer "u," two remaining for the orderer "w," and two remaining for the orderer "z."

As a result of the above, there is a strong possibility that the work-in-progress trays 43d will be carried to the work shelves 58 in the next sorting operation and, as a result, it will become difficult for the third tray storage space 13e to be filled up. In other words, in this system, if the empty third tray storage space 13e decreases, then the details of the picking schedule will be adjusted, so as to prevent the work shelves 58 from being filled up.

In another preferred embodiment, the warehouse control unit 141 determines which of the picking completed buckets 27a and the empty trays 43a are to be carried to each of the assorting stations 21 such that the sorting workloads are averaged. In this system, the efficiency of the sorting work is increased.

In the above-described preferred embodiment, the workload in each of the picking zones is determined by the order count that is at or close to the maximum that can be accommodated in the buckets 27. However, this may be determined by: the number of articles to be picked; the calculated amount of time needed to perform the picking work; the result of calculating the volume of the articles that can be accommodated in the buckets; or the result of calculating the distances that the workers walk.

Instead of the multiple carriers each corresponding to each level of the rack, a single stacker crane may be provided.

Preferred embodiments of the present invention are widely applicable to picking and assorting systems that use the total picking method.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A picking and assorting system for use with a plurality of picking zones, each of the picking zones including an article rack including plural kinds of articles, the article racks being utilized to perform total picking by using first containers, the picking and assorting system comprising:
   a picking schedule making unit configured and programmed to make a picking schedule for one batch of the articles to perform total picking to pick the articles from the article racks and place the articles in the first containers, based on a workload in each of the picking zones;
   an automatic storage system configured and programmed to facilitate assorting articles from the first containers to second containers after the total picking, the automatic storage system including an assorting station including a placement portion onto which the first containers are placed and a work shelf onto which the second containers are placed such that the articles are arranged to be assorted from the first containers to the second containers, a storage shelf onto which the second containers are stored, and a moving device configured to move the second containers between the work shelf and the storage shelf; and
   a controller configured and programmed to, if an article placed into the first containers according to the picking schedule for the one batch remains in the second container after assorting is done but before the second container has been completely filled, order the moving device to move the second container in a work-in-progress state from the work shelf to the storage shelf.

2. The picking and assorting system according to claim 1, wherein
   the picking schedule making unit is configured and programmed to determine a number of the second containers in the work-in-progress state stored in the storage shelf; and
   the picking schedule making unit is configured and programmed to preferentially select articles to be assorted into the second containers in the work-in-progress state stored in the storage shelf when making a picking schedule for the one batch if the number of the second containers in the work-in-progress state stored in the storage shelf exceeds a certain number.

3. The picking and assorting system according to claim 2, wherein
   the controller is configured and programmed to order the moving device to, if some of the articles picked and placed into the first container according to the picking schedule for the one batch cannot be assorted to the second containers, move the first container containing the articles from the placement portion to the storage shelf.

4. The picking and assorting system according to claim 3, wherein
   the picking schedule making unit is configured and programmed to determine a number of the first containers containing articles and stored in the storage shelf; and
   the picking schedule making unit is preferentially configured and programmed to select articles to be assorted together with articles contained in the first containers in which the articles remain stored in the storage shelf when making a picking schedule for the one batch if the number of the first containers containing the articles and stored in the storage shelf exceeds a certain number.

5. The picking and assorting system according to claim 4, wherein
   the automatic storage system includes a plurality of the assorting stations in a plurality of positions; and the controller is configured and programmed to determine which of the first containers and which of the second containers are to be delivered to each of the assorting stations such that assortment workload is averaged.

6. The picking and assorting system according to claim 2, wherein
the automatic storage system includes a plurality of the assorting stations in a plurality of positions; and
the controller is configured and programmed to determine which of the first containers and which of the second containers are to be delivered to each of the assorting stations such that assortment workload is averaged.

7. The picking and assorting system according to claim 1, wherein
the controller is configured and programmed to order the moving device to, if some of the articles picked and placed into the first container according to the picking schedule for the one batch cannot be assorted to the second containers, move the first container containing the articles from the placement portion to the storage shelf.

8. The picking and assorting system according to claim 7, wherein
the picking schedule making unit is configured and programmed to determine a number of the first containers containing articles and stored in the storage shelf; and
the picking schedule making unit is configured and programmed to preferentially select articles to be assorted together with articles in the first containers in which the articles remain stored in the storage shelf when making a picking schedule for the one batch if the number of the first containers containing the articles and stored in the storage shelf exceeds a certain number.

9. The picking and assorting system according to claim 8, wherein
the automatic storage system includes a plurality of the assorting stations in a plurality of positions; and
the controller is configured and programmed to determine which of the first containers and which of the second containers are to be delivered to each of the assorting stations such that assortment workload is averaged.

10. The picking and assorting system according to claim 1, wherein
the automatic storage system includes a plurality of the assorting stations in a plurality of positions; and
the controller is configured and programmed to determine which of the first containers and which of the second containers are to be delivered to each of the assorting stations such that assortment workload is averaged.

11. A picking and assorting system comprising:
a plurality of picking zones, each of the picking zones including an article rack including plural kinds of articles, total picking being performed from the article racks to first containers;
a picking schedule making unit configured and programmed to make a picking schedule for one batch of the articles to perform total picking to pick the articles from the article racks and place the articles in the first containers, based on a workload in each of the picking zones;
an automatic storage system configured and programmed to facilitate assorting articles from the first containers to second containers after the total picking, the automatic storage system including an assorting station including a placement portion onto which the first containers are placed and a work shelf onto which the second containers are placed such that the articles are arranged to be assorted from the first containers to the second containers, a storage shelf onto which the first containers are stored, and a moving device configured to move the first containers between the placement portion and the storage shelf; and
a controller configured and programmed to, if some of the articles picked and placed into the first container according to the picking schedule for the one batch cannot be assorted to the second containers, order the moving device to move the first container containing the articles from the placement portion to the storage shelf.

12. The picking and assorting system according to claim 11, wherein
the automatic storage system includes a plurality of the assorting stations in a plurality of positions; and
the controller is configured and programmed to determine which of the first containers and which of the second containers are to be delivered to each of the assorting stations such that assortment workload is averaged.

13. The picking and assorting system according to claim 11, wherein
the picking schedule making unit is configured and programmed to determine a number of first containers containing articles and stored in the storage shelf; and
the picking schedule making unit is configured and programmed to preferentially select articles to be assorted together with articles in the first containers containing the article and stored in the storage shelf when making a picking schedule for the one batch if the number of the first containers containing the articles and stored in the storage shelf exceeds a certain number.

14. The picking and assorting system according to claim 11, wherein
the automatic storage system includes a plurality of the assorting stations in a plurality of positions; and
the controller is configured and programmed to determine which of the first containers and which of the second containers are to be delivered to each of the assorting stations such that assortment workload is averaged.

* * * * *